United States Patent [19]
Colegrove

[11] 3,894,879
[45] July 15, 1975

[54] PROCESS OF SUSPENDING SOLUBLE XANTHAN GUM AND PUMPABLE COMPOSITIONS SO PRODUCED

[75] Inventor: George T. Colegrove, San Diego, Calif.

[73] Assignee: Kelco Company, San Diego, Calif.

[22] Filed: Nov. 4, 1974

[21] Appl. No.: 520,334

[52] U.S. Cl. ................ 106/189; 106/208; 252/316
[51] Int. Cl. ...................... C08b 25/00; C08b 27/42
[58] Field of Search ............ 106/189, 208; 117/156; 252/316

[56] References Cited
UNITED STATES PATENTS

| | | | |
|---|---|---|---|
| 3,428,464 | 2/1969 | Pollard | 106/38.35 |
| 3,557,016 | 1/1971 | Schuppner | 252/316 |
| 3,625,889 | 12/1971 | Branscum | 252/8.5 A |
| 3,692,552 | 9/1972 | Ruggeberg | 106/208 |
| 3,734,801 | 5/1973 | Sebel | 117/156 |
| 3,765,918 | 10/1973 | Jordan et al. | 106/208 |
| 3,821,008 | 6/1974 | Jordan et al. | 106/38.23 |

*Primary Examiner*—Theodore Morris
*Attorney, Agent, or Firm*—Hesna J. Pfeiffer; J. Jerome Behan

[57] ABSTRACT

Water soluble xanthan gum can be prepared as highly concentrated pumpable suspensions in alcohol-water carriers using hydroxyalkyl cellulose derivatives as the suspending agents. The amount of hydroxyalkyl cellulose in the total composition is between 0.5 and 1.0%, which can be used to suspend between 20 and 50% xanthan.

12 Claims, No Drawings

PROCESS OF SUSPENDING SOLUBLE XANTHAN GUM AND PUMPABLE COMPOSITIONS SO PRODUCED

This invention relates to a process and a composition for preparing a suspension of a water soluble xanthan gum. The slurry produced can be used for metered or automatic addition of the xanthan gum to industrial systems. Previously, xanthan gum has been added as dry powders, necessitating a manual operation.

Water soluble xanthan gum is widely available and used in many industries. For instance, in small percentages it is found in dressings and dye pastes in the textile industry; as suspending agents in liquid pharmaceuticals; as suspending agents in paints, cosmetics, insecticides, car polishes, etc. Xanthan gum is also useful as emulsion stabilizers, viscosity control agents, or bodying agents in food applications. Many of these industrial and food applications of xanthan gum utilize automatic or semi-automatic formulation of the product, whereby the various ingredients are added from storage vessels by timed-metering devices.

Heretofore, the water soluble xanthan gum has been added manually, even with automated industrial plants, as the dry powder feed could not be controlled sufficiently for automatic addition. Also, the dry powder could not be mixed with a common solvent such as water as it is quite soluble and forms a viscous solution, especially in high concentrations, which is difficult to pump and does not flow readily.

It is therefore an object of this invention to provide a pumpable suspension of a soluble xanthan gum which can be easily used in an automated industrial plant. It is a further object of this invention to provide a process for preparing a pumpable xanthan gum suspension. Another object is to provide a xanthan gum suspension. Another object is to provide a xanthan gum suspension which does not contain any substances which interfere in the xanthan application.

the water soluble xanthan gum, which can be used in the process and composition of this invention, is readily commercially available. It is a hydrophilic colloid produced by a bacterium of the species Xanthomonas campestris. The colloid is a polymer containing mannose, glucose, glucuronic acid salts such as potassium glucuronate, sodium glucuronate, or the like, and acetyl radicals. other Xanthomonas bacteria have been found which produce the hydrophilic gum and I have found that any xanthan gum produced by fermentation or other means can be used in this invention.

It has been found that hydroxyalkyl cellulose derivatives in low concentrations will suspend a soluble xanthan gum in an alcohol, or a water-alcohol mixture. By the term "alcohol" is meant any of the lower alkanols; for instance, having one to five carbon atoms. The readily available, inexpensive alcohols are preferred, particularly isopropanol, methanol, or ethanol.

When a water-alcohol blend is employed as the solvent system, the percentage of water in the mixture can be between about 20 and 40% and is preferably between 35 and 40%, volume/volume percentage basis. This percentage is based on the total solvent blend, alcohol being present to make 100%.

The choice between alcohol and alcohol-water as the solvent system is limited only by the identity of the suspending hydroxyalkyl cellulose derivative. Some of the cellulose derivatives are not soluble in pure alcohol. Generally, the alcohol-water solvent system is preferred.

The hydroxyalkyl cellulose derivatives which can be used as suspending agents for the xanthan gums are available commercially. They can be characterized as non-toxic ether derivatives of cellulose having at least three carbon atoms in the hydroxyalkyl side chain. A general structural formula can be illustrated as follows $$R-O-R''OH$$

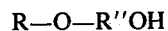

wherein R is the cellulose backbone, and R'' is a straight or branched alkyl group having 3–5 carbon atoms, such as propyl, butyl, isopropyl, isobutyl, etc.

The exact identity of the cellulose backbone, R, is not critical to the practice of this invention. For instance, the family of hydroxypropyl methyl cellulose and hydroxybutyl methyl cellulose derivatives, (R'' equals 3 or 4 respectively) sold under the METHOCEL trademark, vary in degree of substitution and molecular weight. Trade literature describes this class of compounds as having a 2–13% hydroxyalkyl group and a 19–33% methoxy group substitution.

Another commercial class of compounds falling within the formula I above, is a hydroxypropyl cellulose, sold as KLUCEL, R'' equals 3. The KLUCEL product sold is described as having greater than 2 moles of hydroxypropyl groups per mole of anhydroglucose unit, and generally between 3.5 to 4.2 moles of hydroxypropyl per mole anhydroglucose.

The amount of hydroxyalkyl cellulose derivative employed is between 0.25 and 2.0% (weight per volume) and preferably between about 0.5 and 1.0%.

The amount of xanthan gum which can be suspended in this system can be between 20 to about 50% (weight per volume).

The pumpable suspensions of this invention are prepared by adding the hydroxyalkyl cellulose derivative, alcohol or alcohol-water solvent blend, followed by addition of the xanthan gum, all additions accompanied by sufficient agitation to form a homogenous suspension. Although the order of addition of xanthan gum and the hydroxyalkyl cellulose derivative is not critical, it is preferable to add the cellulose first as the final suspension is prepared quickly and easily with good reproducable results.

The final viscosity of the pumpable suspension is between 3,000 and 100,000 centipoise. Viscosity can be determined using commercially available equipment. This range of viscosity is pumpable and can be metered into any system.

This invention is further illustrated by the following examples:

EXAMPLE 1

The indicated amounts of isopropanol or isopropanol-water were formulated as solvent blends. The amount of high viscosity hydroxypropyl cellulose (KLUCEL H) indicated was then added, while stirring. The xanthan gum was then added: either a food grade xanthan gum, e.g., available under the trade name KELTROL, or an industrial grade xanthan gum, available under the trade name KELZAN. The final viscosity was obtained with the Brookfield HAT with the Heliopath attachment using spindle TC at 5 r.p.m. The results are summarized in Table 1.

TABLE 1

| % Hydroxypropyl Cellulose | Xanthan Gum | % Isopropanol | Vicosity |
|---|---|---|---|
| 1.0 | 20% food grade, 80 mesh | 100 | 6,400 cps |
| 1.0 | 20% food grade, 325 mesh | 100 | 3,650 cps |
| 0.5 | 50% industrial grade, 200 mesh | 100 | 3,400 cps |
| 1.0 | 20% industrial grade, 325 mesh | 65 | 6,700 cps |
| 1.0 | 20% industrial grade, 325 mesh | 60 | 8,300 cps |

EXAMPLE 2

Additional formulation work was done to illustrate the use of other hydroxyalkyl cellulose derivatives (METHOCEL) in forming the xanthan suspension. The indicated amount of cellulose gum was used to form a suspension of 20% xanthan (food grade, smaller than 325 mesh) in a 60:40 (volume:volume) isopropanol-water solvent system. The results are summarized in Table 2. All formulations produced good suspensions with only a trace of liquid separation after one month at ambient temperature.

The viscosity of the first four formulations in the next table was measurured on a Brookfield LVT at 6 r.p.m. For the last three formulations, the r.p.m. was at 60.

TABLE 2

| Run | Cellulose Derivative | Viscosity |
|---|---|---|
| A | 1.0% hydroxypropyl methyl cellulose | 4,100 cps |
| B | 1.0% '' | 44,000 cps |
| C | 1.0% '' | 80,000 cps |
| D | 1.0% hydroxybutyl methyl cellulose | 91,000 cps |
| E | 0.5% hydroxypropyl methyl cellulose | 2,300 cps |
| F | 0.5% '' | 3,000 cps |
| G | 0.5% hydroxybutyl methyl cellulose | 3,100 cps |

In these formulations, the hydroxypropyl methyl cellulose used in Run A had 28–30% methoxyl, 7–12% hydroxypropyl, and a thermal gel point of 55°–60°C.; that of Runs B and E had 27–30% methoxyl, 4–7.5% hydroxypropyl and a thermal gel point of 60°–65°C.; then of Runs C and F had 19–24% methoxy, 4–12% hydroxypropyl, and a thermal gel point of 85°C. The hydroxybutyl methyl cellulose of Runs D and G had 17–33% methoxy and 2–13% hydroxybutyl.

Having described the invention, what is claimed is:

1. The process of preparing a pumpable suspension of a water soluble xanthan gum which comprises mixing about 20 to 50% of said xanthan gum and about 0.5 to 10% hydroxyalkyl cellulose derivative in an alcohol solvent or in an alcohol-water solvent system.

2. The process of claim 1 in which the xanthan is added to a previously prepared blend of the hydroxyalkyl cellulose derivative and the solvent.

3. The process of claim 2 wherein the solvent is an alcohol-water system containing 20 to 50% water.

4. The process of claim 1 wherein the alcohol is a lower alkanol having 1–5 carbon atoms.

5. The process of claim 1 wherein the hydroxyalkyl cellulose derivative has the formula R—O—R''OH wherein R is the cellulose backbone, and R'' is a straight or branched alkyl chain of 3–5 carbon atoms.

6. The process of claim 5 wherein the hydroxyalkyl cellulose derivative is hydroxypropyl cellulose, hydroxypropyl methyl cellulose, or hydroxybutyl methyl cellulose.

7. A pumpable suspension of a water soluble xanthan gum comprising a solvent system of alcohol or alcohol-water blend, wherein the water content of the blend is from about 20 to 40%;

said solvent system containing from about 0.5 to 1.0% by weight of hydroxyalkyl cellulose derivative;

and between about 20 to 50% of said xanthan gum.

8. The composition of claim 7 wherein the solvent system is alcohol-water blend.

9. The composition of claim 8 wherein the alcohol is a lower alkanol having 1–5 carbon atoms.

10. The composition of claim 9 wherein the alcohol is methanol, ethanol, or isopropanol.

11. The composition of claim 7 wherein the hydroxyalkyl cellulose derivative is

R—O—R''—OH wherein R is the cellulose backbone, and R'' is a straight or branched chain alkyl of 3–5 carbon atoms 12. The composition of claim 11 wherein the hydroxyalkyl cellulose derivative is hydroxypropyl cellulose hydroxypropyl methyl cellulose, or hydroxybutyl methyl cellulose.

* * * * *